(12) United States Patent
Parashar et al.

(10) Patent No.: US 9,086,923 B2
(45) Date of Patent: Jul. 21, 2015

(54) AUTONOMIC WORKFLOW MANAGEMENT IN DYNAMICALLY FEDERATED, HYBRID CLOUD INFRASTRUCTURES

(71) Applicants: Manish Parashar, Monmouth Junction, NJ (US); Hyunjoo Kim, Monmouth Junction, NJ (US)

(72) Inventors: Manish Parashar, Monmouth Junction, NJ (US); Hyunjoo Kim, Monmouth Junction, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 190 days.

(21) Appl. No.: 13/621,595

(22) Filed: Sep. 17, 2012

(65) Prior Publication Data

US 2013/0073724 A1 Mar. 21, 2013

Related U.S. Application Data

(60) Provisional application No. 61/535,428, filed on Sep. 16, 2011, provisional application No. 61/654,210, filed on Jun. 1, 2012.

(51) Int. Cl.
*G06F 15/173* (2006.01)
*G06F 9/50* (2006.01)

(52) U.S. Cl.
CPC ............ *G06F 9/5038* (2013.01); *G06F 9/5072* (2013.01)

(58) Field of Classification Search
CPC .............................. G06F 9/5038; G06F 9/5072
USPC .......................................... 709/223, 224, 226
See application file for complete search history.

(56) References Cited

U.S. PATENT DOCUMENTS

| | | | |
|---|---|---|---|
| 7,519,711 B2 * | 4/2009 | Mohindra et al. ............ 709/226 |
| 8,250,135 B2 | 8/2012 | Driesen et al. | |
| 8,601,484 B2 * | 12/2013 | Salsbery et al. .............. 718/106 |
| 8,677,318 B2 * | 3/2014 | Mohindra et al. ............ 717/121 |
| 2004/0103195 A1 * | 5/2004 | Chalasani et al. ............ 709/226 |
| 2007/0294405 A1 * | 12/2007 | Mohindra et al. ............ 709/226 |
| 2011/0119373 A1 * | 5/2011 | Chan et al. .................... 709/224 |
| 2011/0153727 A1 | 6/2011 | Li | |

OTHER PUBLICATIONS

Kim, et al. An Autonomic Approach to Integrated HPC Grid and Cloud Usage. 2009 Fifth IEEE International Conference on e-Science, Dec. 9-11, 2012, pp. 366-373.

Kim, et al. Cloud Computing: Principles and Paradigms, Eds. Rajkumar Buyya, James Broberg and Andrzej Goscinski. John Wiley & Sons, Inc., 2011. pp. 275-298.

(Continued)

*Primary Examiner* — Mohamed Wasel
(74) *Attorney, Agent, or Firm* — Fox Rothschild LLP (57) ABSTRACT

An autonomic workflow framework may include a federated cloud that includes a plurality of clouds, where each cloud in the federated cloud includes one or more nodes. An autonomic workflow framework may include a workflow manager configured to receive a workflow. The workflow may include a plurality of stages, and the workflow may be associated with a user objective. An autonomic workflow framework may include an autonomic scheduler in communication with the workflow manager. The autonomic scheduler may be configured to provision one or more of the one or more nodes to process the stages to achieve the user objective.

18 Claims, 9 Drawing Sheets

(56) References Cited

OTHER PUBLICATIONS

Kim, et al. Exploring application and infrastructure adaptation on hybrid grid-cloud infrastructure. Proceedings of the 19th ACM International Symposium on High Performance Distributed Computing, Jun. 20-25, 2010. pp. 402-412.

Kim, et al. Autonomic management of application workflows on hybrid computing infrastructure. Scientific Programming—Science-Driven Cloud Computing, vol. 19, Issues 2-3, Apr. 2011, pp. 75-89.

* cited by examiner

```
<xflow name="YourWorkflow">
<sources>
   <source id="P1" type="Application" value="hostname://app/source/dir"/>
   <source id="P1" type="Data" value="hostname://input/data/dir"/>
   <source id="P1" type="Result" value="hostname://result/location/dir"/>
   <source id="P1" type="AgentType" value="Generic"/>
   <source id="P1" type="ApplicationClass" value="your.GenericApplicationStarterInterface.class"/>
   <source id="P1" type="ApplicationParameter" value="your app options"/>
   <source id="P2" type="Application" value="hostname://app/source/dir"/>
   <source id="P2" type="Data" value="hostname://input/data/dir"/>
   <source id="P2" type="Result" value="hostname://result/location/dir"/>
   <source id="P2" type="AgentType" value="Customized"/>
   <source id="P2" type="ApplicationClass" value="your.ApplicationAgentInterface.class"/>
   <source id="P2" type="ApplicationParameter" value="your app options"/>
</sources>
<objectives>
   <objective id="P1" type="Policy_*TTC" value="your_TTC_in_seconds"/>
   <objective id="P2" type="Policy_COST" value="your_budget_limit_in_dollar"/>
</objectives>
<nodes>
   <node id="StartNode" type="Start"/>
   <node id="P1" type="app1"/>
   <properties>
     <property id="P1" value="your_app1_parameter1=value1"/>
     <property id="P1" value="your_app1_parameter2=value2"/>
     <property id="P1" value="your_app1_parameter3=value3"/>
   </properties>
  <node id="P2" type="app2"/>
  <properties>
     <property id="P2" value="your_app2_parameter1=value1"/>
     <property id="P2" value="your_app2_parameter2=value2"/>
     <property id="P2" value="your_app2_parameter3=value3"/>
  </properties>
  <node id="EndNode" type="End"/>
</nodes>
<transitions>
   <transition from="StartNode" to="P1"/>
   <transition from="P1" to="P2"/>
   <transition from="P2" to="EndNode"/>
</transitions>
</xflow>
```

AUTONOMIC WORKFLOW MANAGEMENT IN DYNAMICALLY FEDERATED, HYBRID CLOUD INFRASTRUCTURES

CROSS-REFERENCE TO RELATED APPLICATION

This application claims priority to U.S. Provisional Application No. 61/535,428, filed on Sep. 16, 2011, and U.S. Provisional Application No. 61/654,210, filed on Jun. 1, 2012, the disclosures of which are incorporated herein by reference in their entireties.

GOVERNMENT RIGHTS

The work described herein was funded, in whole or in part, by grant number 0758566 from the National Science Foundation. The United States Government has certain rights in the invention.

BACKGROUND

Public clouds have emerged as an important resource class enabling the renting of resources on-demand and supporting a pay-as-you-go pricing policy. Furthermore, private clouds or data centers are exploring the possibility of scaling out to public clouds to respond to unanticipated resource requirements. As a result, dynamically federated, hybrid cloud infrastructures that integrate enterprise datacenters, grids, private and/or public clouds are becoming increasingly important. Such federated cloud infrastructures also provide opportunities to improve application quality of service by allowing application tasks to be mapped to appropriate resource classes. For example, a typical application workflow is usually comprised of multiple application stages, which in turn, can be composed of different application components with heterogeneous computing requirements in terms of the complexity of the tasks, execution time, and data requirements. Managing and optimizing these workflows on dynamically federated hybrid clouds can be challenging, especially since doing so requires simultaneously addressing resource provisioning, scheduling and mapping while balancing quality of service with costs.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. Nothing in this document is to be construed as an admission that the embodiments described in this document are not entitled to antedate such disclosure by virtue of prior invention. As used herein, the term "comprising" means "including, but not limited to."

In an embodiment, an autonomic workflow framework may include a federated cloud that includes a plurality of clouds, where each cloud in the federated cloud includes one or more nodes. An autonomic workflow framework may include a workflow manager configured to receive a workflow. The workflow may include a plurality of stages, and the workflow may be associated with a user objective. An autonomic workflow framework may include an autonomic scheduler in communication with the workflow manager. The autonomic scheduler may be configured to provision one or more of the one or more nodes to process the stages to achieve the user objective.

In an embodiment, an autonomic workflow framework may include a workflow manager configured to receive a workflow. The workflow may include a plurality of stages and may be associated with a user objective. The autonomic workflow framework may include an autonomic scheduler in communication with the workflow manager. The autonomic scheduler may be configured to provision one or more of the nodes to process each stage in order to achieve the user objective. The autonomic workflow framework may include a resource manager in communication with the autonomic scheduler and a federated cloud that includes a plurality of clouds. Each cloud in the federated cloud may include one or more nodes, a cloud agent in communication with the resource manager, and one or more application agents. The autonomic workflow framework may include an autonomic engine application space that is accessible by the autonomic scheduler, the workflow manager and each application agent.

BRIEF DESCRIPTION OF THE DRAWINGS

FIG. 3 illustrates an example description of a model as a workflow.

DETAILED DESCRIPTION

Figure 1:
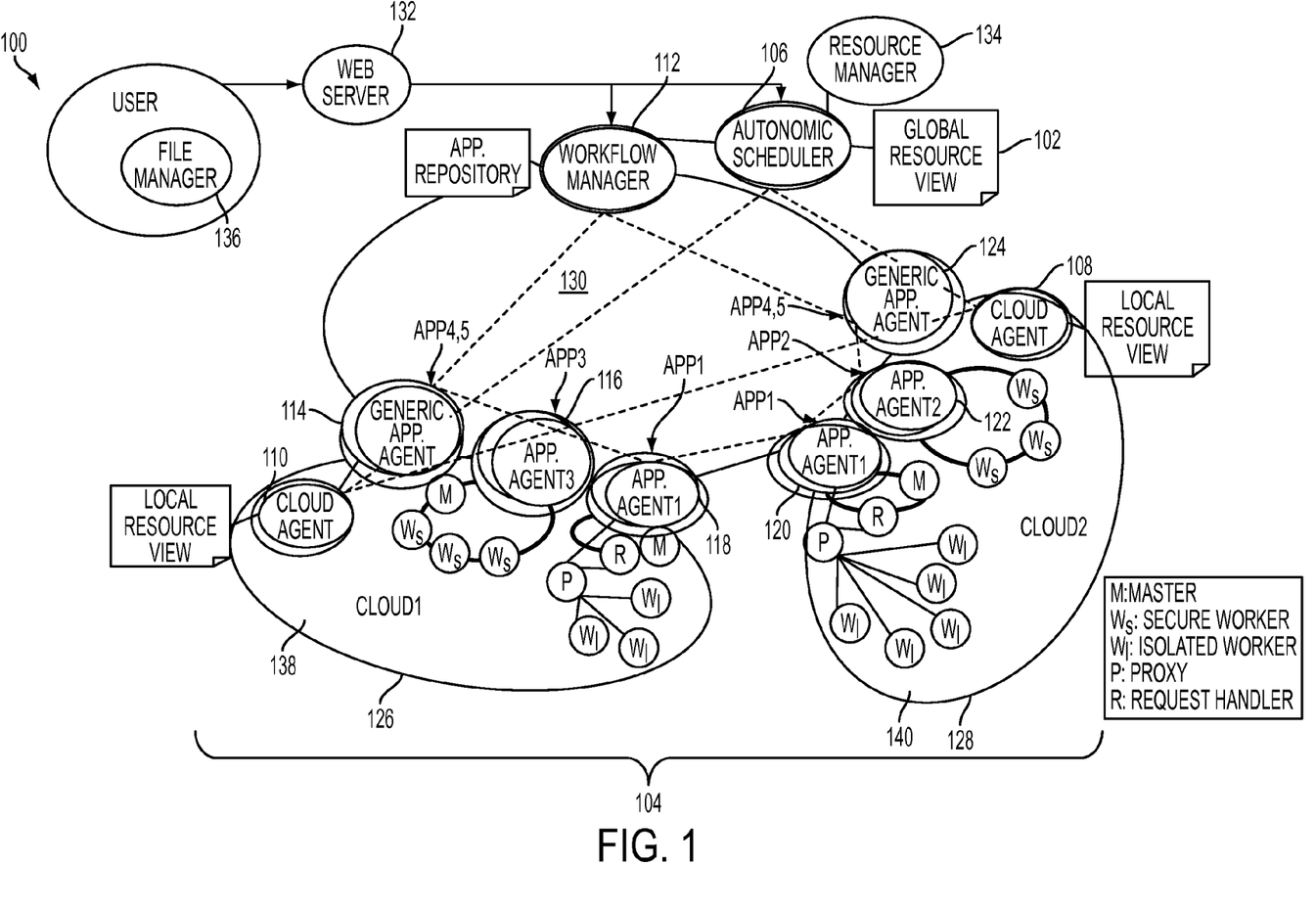
FIG. 1 illustrates an example of an autonomic workflow framework according to an embodiment.

In an embodiment, a workflow framework, such as that illustrated by FIG. 1, may enable workflow execution and/or federated cloud management. In an embodiment, a workflow may refer to an application programming model that includes a sequence of stages to be performed in a certain order. The output of one stage may become the input for the next stage. For instance, an example workflow may be an algorithm divided into two or more stages. As an example, a data analysis algorithm, such as Decentralized Online Clustering, may be divided into two or more stages. In an embodiment, if one stage in a workflow is delayed due to lack of resources, inappropriate resource provisioning, degradation of performance caused by increase in usage and/or the like, the entire execution time of the workflow may be lagged.

In an embodiment, each stage of a workflow may run the same application with different length or different complexity of computation. In an embodiment, each stage of a workflow may run different applications requiring heterogeneous resources. For example, a first stage of a workflow may run a computation-intensive application, which may produce a large result. A second stage of a workflow may run a memory-intensive application with the result of the first stage, and a final stage of the workflow may run a complex combination of applications on the result of the second stage to generate a final output. As such, a cluster or a datacenter with homogeneous resources may not be able to handle the entire process of a workflow.

In an embodiment, a workflow may be processed according to one or more user objectives. A user objective may be one or more user-defined restrictions or limitations relating to processing a workflow. An example of a user objective may include a time constraint within which a workflow must be completed. For example, a user objective may specify that a workflow is to be completed by a certain time on a certain date. Another example of a user objective may be a budget constraint to rent resources. For example, a user may specify that the cost of processing a workflow should not exceed a certain amount. As such, the cost to rent or otherwise use resources to process the workflow may not exceed the specified amount.

Another example of a user objective may be privacy constraints associated with processing a workflow. For example, a user may specify a location preference for execution of a stage due to security reasons. In an embodiment, even though a federated cloud may include multiple private clouds, grids and/or public clouds, and a user's workflow may run on any of them, the user may constrain the run of certain stages of the workflow on a local private cloud such as one located, for example, inside of a user's institute, company or campus. For example, a user may constrain the run of certain stages on a local private cloud for reasons of protecting data privacy. As a result, such a constraint may be specified as a location preference, or cloud preference.

Another example of a user objective may be a resource constraint. For example, a user may specify that resources should be selected to match an application type associated with a workflow. For example, if a workflow is a computation-intensive workflow, it may be matched with one or more resources that are capable of processing a computation-intensive workflow. Similarly, a workflow that is data-intensive may be matched with one or more resources that are capable of processing a data-intensive workflow.

In an embodiment, each stage of a workflow may be run by different types of resource classes that are distributed. A resource class may be a private cloud, a cluster built inside of an organization and used by privileged users, a grid such as, for example, XSEDE (high performance computing grids used by registered users), and/or public clouds such as, for example, Amazon EC2, Microsoft Azure, Rackspace, GoGrid, or others that allow users to rent a virtual machine. In an embodiment, a cloud may include one or more nodes. A cloud may include various types of nodes that have different capabilities with different hardware specifications such as, for example, CPU, memory, input/output and/or the like. In an embodiment, a node type (or instance type) in a cloud may be a single resource class.

As such, a workflow may be executed over multiple infrastructures, such as, for example, a federated cloud infrastructure that consolidates cluster/datacenter, private/public clouds, and grids. Each workflow stage may be managed in the context of a workflow over the federated cloud infrastructure. In this situation, an appropriate resource class and the amount of resources may be selected and provisioned for executing stages, and the input and output of a stage may be managed. For example, the output of a stage may be transferred to another location where the next stage runs.

In an embodiment, a workflow may be associated with one or more tags, such as, for example, XML tags that identify one or more rules. In an embodiment, an XFlow model description may be used. In an embodiment, an XFlow model with keywords that include application information and/or user objectives may be used. A tag may include id, type and value. Id may identify the stage, and type and value may describe a keyword and its corresponding value. Example keywords may include 'source', 'objective', 'node', 'property' and 'transition'.

Source: 'source' may describe the application information for a stage. The types in a source tag may be 'Application', 'Data', 'Result', 'AgentType', 'ApplicationClass' and 'PipplicationParameter'. The values for 'Application' and 'Data' may be the location of the application executables and data. The value for 'Result' may be the location where the results should be placed. 'AgentType' may have either 'generic' or 'customized' as its value based on the application agent type that will consume the application. For example, if a user did not implement a customized application agent for an application, a generic application may execute the application. The application class name may be set as the value for 'ApplicationClass', and one or more required application arguments may be set as the value for 'ApplicationParameter'.

Objective: 'objective' may describe customer objectives for a stage. An objective may be a constraint associated with the processing of a stage. Objectives may include, for example, Policy_TTC, Policy_Cost, and Policy_PRIVACY. Polcy_TTC (time-to-complete) may set a time constraint within which a stage is to be completed. In an embodiment, a value for the Policy_TTC constraint may be seconds. Policy_Cost may set a budget constraint for a stage. In an embodiment, a value for the Policy_Cost constraint may be one or more currency values. Policy_PRIVACY may restrict the clouds that can run a stage. In an embodiment, a value for a Policy_PRIVACY constraint may be one or more cloud names.

In an embodiment, an objective may include acceleration, conservation and/or resilience. Acceleration may refer to a way in which clouds may be used as accelerators to reduce application time-to-completion. For example, cloud resources may be used to exploit an additional level of parallelism by offloading appropriate tasks to cloud resources, within applicable budget constraints. Conservation may refer to a way in which clouds can be used to conserve HPC grid allocation within applicable runtime and/or budget constraints. Resilience may refer to a way in which clouds may be used to handle unexpected situations such as, for example, unanticipated queue delays or failures of working nodes. In an embodiment, additional cloud resources may be requested to alleviate the impact of the unexpected situations and meet user objectives within applicable runtime and/or budget constraints.

Node: 'node' may define an identification and application name for each stage. Each node may include property tags to further describe application parameters.

Property: 'property' may describe application parameters which should be passed to run an application. Each stage may have multiple properties and these values may be sent to a relevant application agent. The value may include a parameter name and its value separated by '='.

Transition: 'transition' may define an order of stages of a workflow. A transition may include a pair of from and to. StartNode and EndNode may be dummy stages to indicate the start stage and end stage of a workflow.

Figure 2:
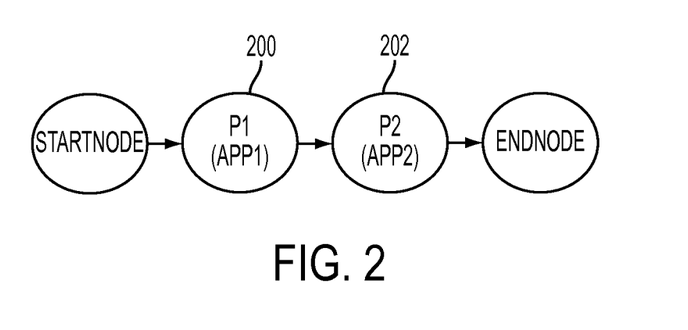
FIG. 2 illustrates an example workflow according to an embodiment.

FIG. 2 illustrates an example workflow according to an embodiment. The workflow has two stages identified with P1 200 and P2 202. In an embodiment, the stage P1 200 is to run "app1" which is to be executed by a generic application agent. The stage P2 202 is to run "app2," which will be consumed by the given customized application agent. The stage P1 200 should be completed within a time constraint, and the stage P2 202 has a budget constraint. FIG. 3 illustrates an example description of this model as a workflow.

FIG. 1 illustrates an example of an autonomic workflow framework according to an embodiment. The autonomic workflow framework 100 may support a wide range of workflows, master/worker applications and/or MapReduce applications. Each workflow may be associated with one or more user objectives. Multiple workflows may be submitted into the autonomic workflow framework 100 at various times, and may cause resources to compete to achieve user objectives of the workflow. The autonomic workflow framework 100 may monitor and manage submitted workflows. An autonomic workflow framework may be implemented in hardware, software and/or a combination of hardware and/or software.

In an embodiment, an autonomic workflow framework may include a federated cloud. For example, the autonomic workflow framework illustrated in FIG. 1 illustrates a federated cloud 104 having two clouds 126, 128. A federated cloud may include additional and/or alternate clouds within the scope of this disclosure.

A federated cloud 104 may be a virtually consolidated cloud of private and/or public clouds. A federated 104 cloud may facilitate movement of workloads across internal and/or external clouds according to business and/or application needs. This federation may fulfill dynamically changing resource requirements elastically because a single provider may have a finite resource capacity regardless of its size. In an embodiment, a cloud may have one or more associated nodes. A node may be a running instance in a cloud of a federated cloud that provides processing and/or storage capability to run stages of workflows. In an embodiment, a node may be a running instance on a virtual or physical machine.

A cloud may join or leave a federated 104 cloud dynamically, and may scale its cloud nodes up or down based on the needs of the resources. A federated cloud 104 may expand or scale out to other clouds (or cloudburst) whenever it requires more resources due to, for example, dynamic workloads, spikes in demand, performance degradation of existing clouds, or failures. A federated cloud 104 may be able to integrate heterogeneous resource classes (or cloudbridge) in terms of platform, infrastructure, hardware and/or the like. For example, a federated cloud 104 may be built with private clouds of bare machines, public clouds of virtual machines and high performance grids. A federated cloud 104 may shrink or scale down or reduce the running cost, or to conserve its capacity for other uses when the bursted resources become idle.

A federated cloud 104 may increase the number of opportunities to provision more appropriate resources for given jobs based on user objectives, and different resource classes may be mixed to achieve user constraints. Moreover, application requirements and resource status may change, for example, due to workload surges, system failures or emergency system maintenance. As a result, provisioning may be adapted to accommodate these changes. The availability and capability of nodes in the federated cloud may be managed and provisioned to each workflow stage. For robustness, replication of centralized components may be used, and a replica may take control when a failure occurs. For example, the robustness of the workflow may be enforced by running replicas of the workflow manager 112, the autonomic scheduler 106 and/or one or more cloud agents 114, 116, 118, 120, 122, 124. Replicas of additional and/or alternate components may be used within the scope of this disclosure.

In an embodiment, a cloud of a federated cloud may include a cloud agent and one or more application agents. For example, as illustrated by FIG. 1, Cloud 1 126 includes a cloud agent 110, and application agents 114, 116, 118. Similarly, Cloud 2 128 includes a cloud agent 108 and application agents 120, 122, 124. In an embodiment, a cloud agent may be a resource manager for a cloud and may be responsible for a group of cloud nodes joining and leaving the federated cloud infrastructure. A cloud agent may also monitor and manage one or more local cloud nodes and their resource status. In an embodiment, an application agent may be an execution manager for one or more applications. An application agent may retrieve one or more stages of one or more workflows and may execute them using one or more nodes in its local cloud.

In an embodiment, the autonomic scheduler 106 and cloud agents 108, 110 may manage the federated cloud 104. In an embodiment, as illustrated by FIG. 1, a federated cloud 104 may be managed locally by each cloud agent 108, 110. In an embodiment, a federated cloud 104 may be managed globally by an autonomic scheduler 106. The autonomic scheduler 106 illustrated in FIG. 1 may be in communication with the workflow manager 112, a resource manager 134 and/or one or more application agents 114, 116, 118, 120, 122, 124 of one or more clouds. The autonomic scheduler 106 may be responsible for managing global resource availability of one or more clouds by building a global resource view from distributed clouds. In an embodiment, each cloud agent may have only its own cloud resource status. A cloud agent may send its cloud resource status to an autonomic scheduler so that the scheduler can have knowledge of the global resource status (for example, availability and capability). In an embodiment, an autonomic scheduler 106 may communicate with cloud agents 108, 110. Each cloud agent may have its local cloud resource status and the autonomic scheduler may gather this local resource status from cloud agents to build a global resource view. In an embodiment, the autonomic scheduler 106 may monitor the resource status of cloud nodes using the resource manager 134. In an embodiment, a resource status may refer to CPU availability, memory, network bandwidth and/or the like associated with a cloud node. The autonomic scheduler 106 may schedule workflow stages by selecting one or more clouds 126, 128 and deciding the number of nodes per cloud that should be used based on user objectives, resource status and/or changing workloads. In an embodiment, the resource manager 134 may periodically gather real-time resource statuses for one or more cloud nodes. The resource manager 134 may provide to the autonomic scheduler 106 a resource status of a specific node, a group of nodes, nodes of a cloud, all nodes in the federated cloud and/or the like.

In an embodiment, a cloud agent 108, 110 may be responsible for joining and leaving the federated cloud 104 with a group of cloud nodes. A cloud agent 108, 110 may manage and monitor local cloud nodes and resource status. A cloud agent 108, 110 may observe dynamically changing node availability and resource usage during the stage runs.

In an embodiment, each cloud 126, 128 may have a cloud agent 108, 110 join the federated cloud 104. A cloud agent 108, 110 may send a join request to the autonomic scheduler 106 with a list of the address of local nodes. The autonomic scheduler 106 may register a cloud 126, 128 into the federated cloud 104 as a new resource class. The autonomic scheduler 106 may add the cloud agent 108, 110 into the agent entries with which to communicate, and may add the cloud nodes to a list of available nodes. If the cloud agent 108, 110 sends a leave request to the autonomic scheduler 106, the autonomic scheduler may remove the cloud agent from the agent entries and all of the cloud nodes from the available node list. The autonomic scheduler 106 may also deregister the resource class.

In an embodiment, the resource manager 134 may monitor node availability and resource status, and may gather this information from one or more cloud agents 108, 110. Node availability may indicate that a node is not running a stage and is ready to run a new stage. This may change over time due to the usage of running stages and/or possible failures or unexpected conditions of one or more nodes. In this case, a cloud agent 108, 110 may notify the resource manager 134 of the changed availability so that the autonomic scheduler 106 may have the latest view of the nodes' availability. Because resource status may change frequently, a cloud agent 108, 110 may periodically gather one or more resource statuses from local nodes and may update the resource manager 134.

In an embodiment, when a workflow is submitted to the workflow manager 106, the workflow manager may send the workflow to an autonomic cloud engine space, such as the autonomic cloud engine space 130 illustrated in FIG. 1. The autonomic scheduler 106 may schedule one or more stages of a workflow based on one or more associated user objectives. The schedule may include resource classes and/or the number of nodes for each resource class. When the stage is picked up from the autonomic cloud engine space 130 and is ready to start, the autonomic scheduler 106 may provision the scheduled number of nodes for the scheduled resource classes from the available nodes as indicated by the list of available nodes. Because the workload of the stage and the status of the allocated resources may dynamically change during the run, the resource allocation may be adapted to achieve the one or more user objectives. As such, the workflow manager 112 may monitor the progress of workflow processing. The autonomic scheduler 106 may reschedule the remaining tasks of a stage if need be, and may adjust resource provisioning if the workflow manager 112 requests resource adaptation. Because local nodes of a cloud, such as, for example, a private cloud or HPC grids, may not be accessible from outside nodes, the autonomic scheduler 106 may send the provisioned node list to the relevant cloud agent 108, 110. The relevant cloud agent 108, 110 may manage processing of one or more tasks of one or more stages by the provisioned nodes of the associated cloud 126, 128.

The workflow manager 112 may submit workflows to the autonomic cloud engine space 130. If there is no existing corresponding application agent to pick up a stage of a workflow from the autonomic cloud engine space 130, a new application agent may be provisioned to pick up the stage. Otherwise, the stage may wait in the autonomic cloud engine space 130 for a corresponding application to pick it up. In an embodiment, the order in which workflow stages are picked up by a corresponding application may be determined by a consumption or scheduling policy.

An application agent 114, 116, 118, 120, 122, 124 may pick up a stage from the space 130 so as to consume it in its local cloud. These functionalities may be provided as Internet-based services. For example, a user may submit a workflow, retrieve its result, and monitor resources and the progress of the workflow via a computing device, such as a web server 132.

An autonomic workflow framework, such as the framework 100 illustrated in FIG. 1, may be implemented on top of an autonomic cloud engine. An autonomic cloud engine may support dynamic federation, autonomic cloud bursting to scale out to public clouds, and/or cloud bridging to integrate multiple datacenters, grids and/or clouds. CometCloud, an example of an autonomic cloud engine, is described in Hyunjoo Kim and Manish Parashar, CometCloud: An Autonomic Cloud Engine, *Cloud Computing: Principles and Paradigms*, Wiley, Chapter 10, pp. 275-297, April 2011.

An autonomic computing engine may enable the dynamic and on-demand federation of clouds and/or grids. An autonomic computing engine may enable the deployment and execution of applications on these federated environments. An autonomic cloud engine may support highly heterogeneous and dynamic cloud/grid infrastructures, enabling the integration of public/private clouds and autonomic cloud bursts (i.e., dynamic scale-out to clouds to address dynamic workloads, spikes in demand, and/or other requirements).

Figure 4:
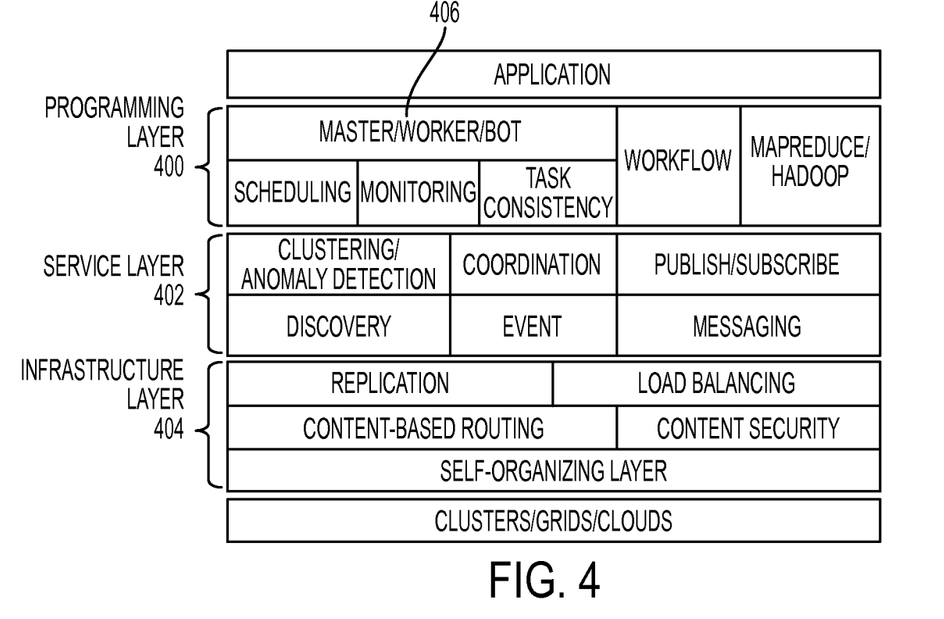
FIG. 4 illustrates an example autonomic cloud engine according to an embodiment.

In an embodiment, an autonomic cloud engine may include a programming layer 400, a service layer 402 and an infrastructure layer 404 as illustrated in FIG. 4. The infrastructure layer 404 may use the Chord self-organizing overly and the Squid information discovery and content-based routing substrate that is built on top of Chord. The routing engine may support flexible content-based routing and complex querying using partial keywords, wildcards, ranges and/or the like. It may also assist with the location of one or more peer nodes with data elements that match a query or message.

In an embodiment, the service layer 402 may provide a range of services to support autonomics at the programming and application levels. The service layer 402 may support a Linda-like tuple space coordination model, and may provide a virtual shared-space abstraction as well as associative access primitives. Dynamically constructed transient spaces may also be supported and may enable applications to exploit context locality to improve system performance.

In an embodiment, the programming layer 400 may provide the basic framework for application development and management. The programming layer 400 may support a range of paradigms, including but not limited to, the master/worker/BOT. In this paradigm, masters may generate tasks, and workers may consume them. Masters and workers may communicate via virtual shared space or via a direct connection. Scheduling and monitoring of tasks may be supported by the application framework, and the task consistency service may handle lost and/or failed tasks. Other supported paradigms may include, without limitation, workflow-based applications and MapReduce/Hadoop.

Figure 5:
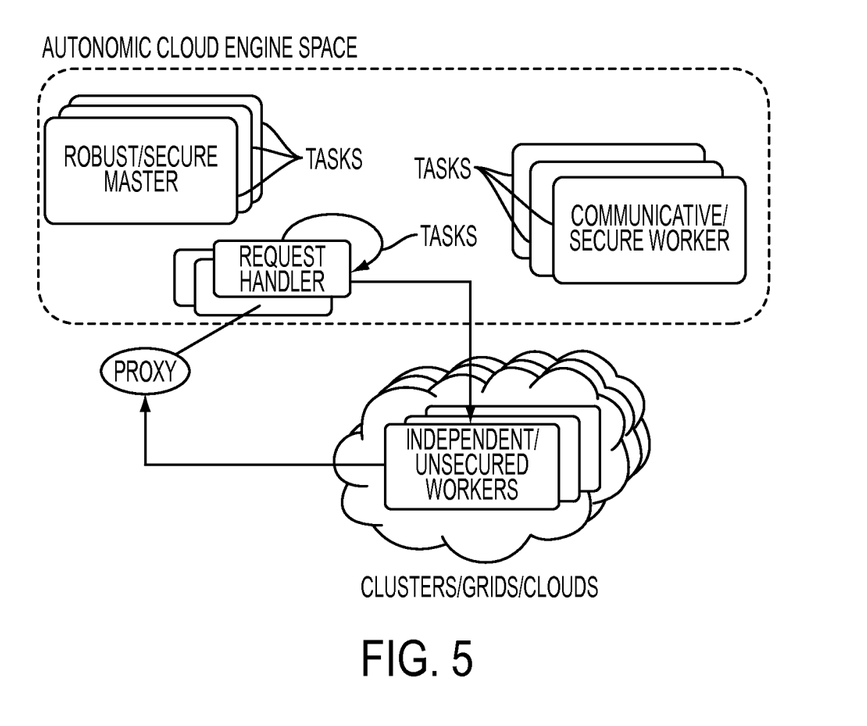
FIG. 5 illustrates example workers according to an embodiment.

The master/worker/BOT layer 406 may support the dynamic addition or removal of master and/or worker nodes from any of the federated environments to enable on-demand scale up/down or out/in. The master/worker/BOT layer 406 may support two classes of workers, secure workers and unsecured (or isolated) workers as illustrated in FIG. 5. Secure workers may be able to access and/or host at least a part of the virtual shared space coordination infrastructure. Unsecured workers, on the other hand, may only provide computational cycles.

In an embodiment, an autonomic cloud engine may use a pull-based task consumption model, meaning that workers may pull tasks whenever the workers become idle. This model may be well-suited for cases where the capabilities of workers and/or the computational requirements of the tasks are heterogeneous. The virtual shared space may be used to host application tasks. In an embodiment, the virtual shared space may host data associated with the tasks. Secure workers may connect to the space and pull tasks from the space. Unsecured workers may only connect to the space through a proxy. In an embodiment, an autonomic cloud engine may provide autonomic management services and may support autonomic cloudburst driven by one or more user-defined policies.

Referring back to FIG. 1, in an embodiment, the workflow manager 112 and application agents 114, 116, 118, 120, 122, 124 may manage workflows and/or workflow processing. The autonomic workflow framework 100 may support master/worker, MapReduce and/or workflow programming models. A workflow programming model may consider a workflow having multiple stages, where the stages are to be executed in an order and where each stage is capable of running a different application or the same application with different task lengths, computational requirements, data and/or the like. However, other programming models may be described as a workflow. For example, master/worker may be considered a workflow with a single stage. As another example, MapReduce may be considered a workflow with two stages, Map and Reduce.

Figure 6:
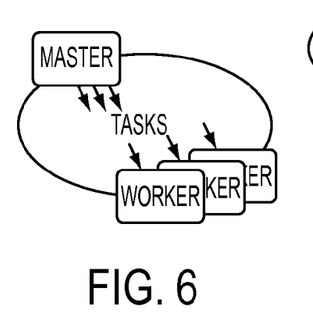
FIG. 6 illustrates example masters and secure workers according to an embodiment.
Figure 7:
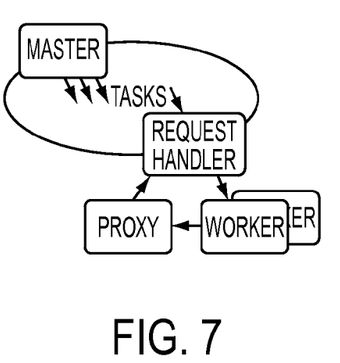
FIG. 7 illustrates example masters and isolated workers according to an embodiment.
Figure 8:
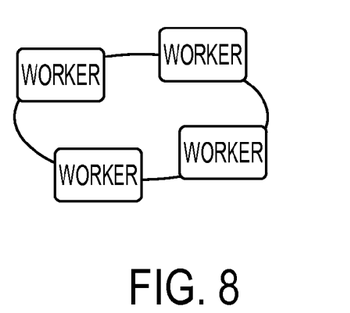
FIG. 8 illustrates example secure workers according to an embodiment.

FIGS. 6-8 illustrate three different application scenarios according to various embodiments. FIG. 6 illustrates one or more masters and secure workers. FIG. 7 illustrates one or more masters and isolated workers, and FIG. 8 illustrates secure workers. Regarding the scenarios illustrated by FIGS. 6 and 7, the master may generate application tasks associated with processing a stage and may insert them into the application space. The workers may pick up a task from the application space and may consume it. The secure workers illustrated in FIG. 6 may access the application space directly, whereas the unsecured workers illustrated in FIG. 7 may not access the application space directly, but rather may receive tasks via a request handler, a proxy or other gateway node. As such, secure workers may be able to access task tuples and data included in the tuple directly from the application space, whereas unsecured workers may only access tasks through an intermediary. Using unsecured workers may prevent workers from hosting task tuples or data, and may reduce the overhead of hosting the application space and managing the overlay in case the application space does not need to be increased. Referring to FIG. 8, the multiple secure workers may execute a single task communicating with each other and sharing data.

Referring back to FIG. 1, the autonomic workflow framework 100 may include one or more components for performing workflow management. The autonomic workflow framework 100 may include a workflow manager 112. The workflow manager 112 may receive a new workflow, obtain a schedule from the autonomic scheduler 106, submit each stage of the workflow in a sequence, monitor stage progress and/or receive the results of the stages. Once the workflow is completed, the workflow manager 112 may store the results until a user retrieves them through the web server 132.

The workflow manager 112 may be responsible for managing the entire process of a workflow. The workflow manager may insert a stage of a workflow into the autonomic cloud engine space 130, and may receive its result from the application agent 114, 116, 118, 120, 122, 124 which completes the stage. The workflow manager 112 may store stage results for user retrieval and may repeat these steps for other stages in the workflow.

In an embodiment, the autonomic workflow framework 100 may include two shared virtual spaces. One virtual space may be the autonomic cloud engine space 130, which may be shared between the workflow manager and the application agents to host workflow stages. The other virtual space may be application management space 138, 140, which may be shared between masters and workers to host application tasks. For example, if a stage is running a master/worker application, the stage may be inserted into the autonomic cloud engine space 130. After an application agent picks up the stage from the autonomic cloud engine space 130, a master and the workers may begin processing application tasks of the stage. In an embodiment, the master may gather the completed tasks and forward them to the responsible application agent when the stage is completed because the master may not communicate with the workflow manager directly. The communication overhead between the master and the responsible application agent may be removed by running the master on the same node with the responsible application agent. The application agent may send the result of a stage to the workflow manager. The workflow manager 112 may monitor workflow progress and if the result of stage is not returned within an expected time, the workflow manager 112 may determine if the stage is missing or failed, and may determine whether a user objective or user constraint may be violated. If the workflow manager 112 determines that a stage is missing or has failed, the workflow manager may regenerate and/or reschedule the stage.

In an embodiment, one or more clouds within the autonomic workflow framework 100 may include one or more generic application agents 114, 124. A generic application agent 114, 124 may pick up a stage registered in the application repository and may consume it in its local cloud. In an embodiment, when a cloud joins the federated cloud, a generic application agent 114, 124 may be created as a default for the cloud. The generic application agent may start pulling a stage registered in the application from the autonomic cloud engine space 130. If the stage needs a customized application agent 116, 118, 120, 122, a new customized application agent may start when the stage is submitted into the space. The customized application agent 116, 118, 120, 122 may pick up only the specified application stage. In an embodiment, a customized application agent 116, 118, 120, 122 may be used if an application requires additional steps or customized procedures to execute, or needs higher priority to be consumed. A customized application agent 116, 118, 120, 122 may pick up one or more stages only for the application.

In an embodiment, the type of application agent, either generic or customized, may be specified for one or more stages in the workflow description. When an application agent picks a stage up, it may follow a First Come First Serve (FCFS) or Shortest Deadline First Serve (SDFS) consumption policy. A stage submitted earlier is consumed first for FCFS. A stage which has the shortest deadline may be consumed first for SDFS. Each application agent may have a different consumption policy. In an embodiment, SDFS may be applied first, and FCFS may be used if there is no stage that should start immediately to meet a user objective.

In an embodiment, if a stage is scheduled to multiple resource classes, the stage may need a hybrid run across clouds. The application agent which picks up the stage from the space may become a coordinator. The application agent may divide tasks to multiple agents, communicate with them, and gather results from them. The coordinator may also communicate with the workflow manager 112 and the autonomic scheduler 106 to retrieve application parameters and provisioned node addresses. When the autonomic scheduler 106 provisions resources for the stage, it may allocate assistant application agents on the other clouds so that the relevant cloud agents 108, 110 start the stages. The assistant application agents may communicate with the coordinator to obtain workloads and worker addresses and to send back results. When each assistant application agent completes its allocated tasks, it may send the result to the coordinator. The coordinator may gather the results from all assistant application agents and may send them to the workflow manager 112.

In an embodiment, the autonomic workflow framework 100 may include a file manager 136. Before a stage begins to run, relevant input data may be transferred to the cloud node where the stage is to run. Output data may be gathered in the workflow manager 112 after a stage is completed so that a user can retrieve results relatively quickly. The file manager 136 and the application agents 114, 116, 118, 120, 122, 124 may be responsible for transferring input or output data.

Figure 9:
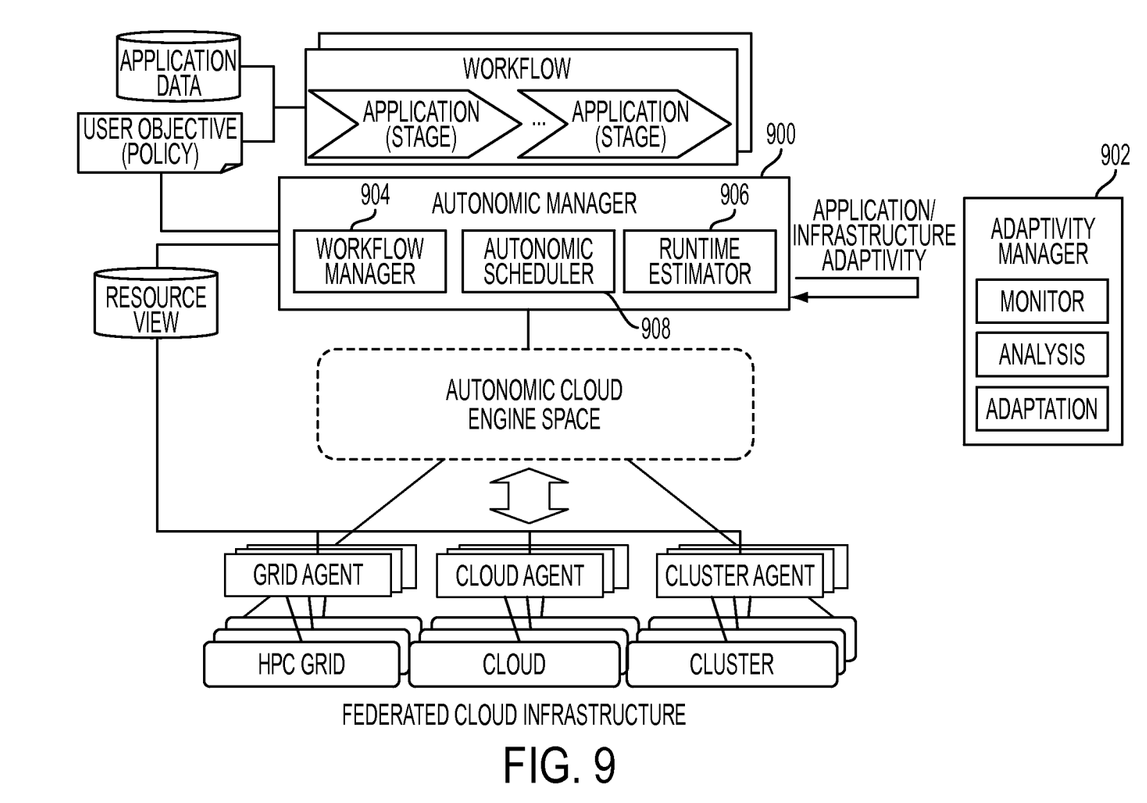
FIG. 9 illustrates an example architecture of autonomic workflow management on a federated cloud according to an embodiment.
Figure 10:
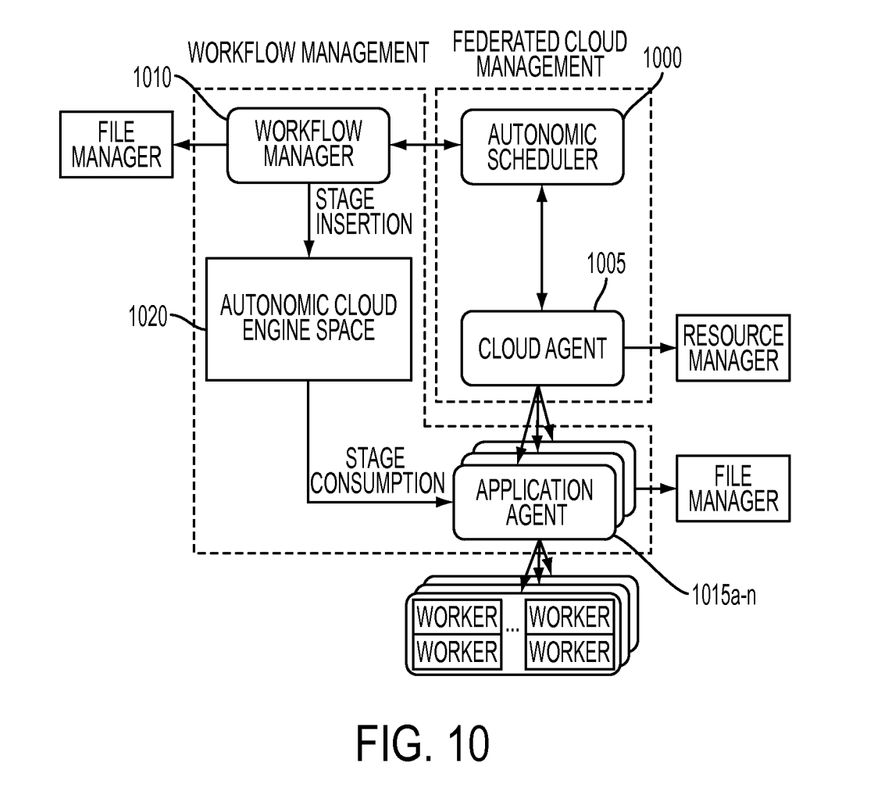
FIG. 10 illustrates an example diagram of a workflow framework according to an embodiment.

FIGS. 9 and 10 illustrate example procedures for managing autonomics according to various embodiments. FIG. 10 illustrates a diagram of a workflow framework according to an embodiment. The autonomic scheduler 1000 and one or more cloud agents 1005 may manage the federated cloud, and the workflow manager 1010 and application agents 1015a-n may be responsible to manage workflows. The workflow manager 1010 may submit workflow stages into autonomic cloud engine space 1020, and an application agent 1015a-n may pick up a relevant stage from the space and execute it on its local cloud.

FIG. 9 illustrates an architecture of autonomic workflow management on a federated cloud according to an embodiment. The autonomic workflow management may be composed of the autonomic manager 900 and the adaptivity manager 902. The autonomic manager 900 may include three components: (a) a workflow manager 904 that submits and collects results of each stage of a running workflow; (b) a runtime estimator 906 that estimates the execution time of each stage of workflows on available resource classes in the federated cloud; and (c) an autonomic scheduler 908 that makes resource provisioning decisions for each stage of workflows based on requirements, user objectives and constraints. The adaptivity manager 902 may monitor the progress of running stages to determine whether user objectives are satisfied. The adaptivity manager 902 may modify and/or adapt the provisioning of resources if a potential violation of one or more user objectives is detected.

In an embodiment, to address the possibility of failures, replicas may be used. Referring back to FIG. 1, the workflow manager 112, the autonomic scheduler 106 and/or one or more cloud agents 108, 110 may each have their own replica. A replica may be updated whenever a change occurs. Because a message from outside triggers changes, whenever the original member receives a message, it may check if any local variable is updated and only sends the changed data to its replica when the variable is updated. The original member may listen for heartbeat messages from its replica, and the replica may periodically send a heartbeat message to its original member. If the original member does not receive a heartbeat message in a certain time period, it may recognize this as a sign that its replica has failed. If a replica cannot connect to the original member, meaning that the listening port is closed, then the replica may detect that the original member has failed.

In an embodiment, after a replica takes over, a new workflow manager may notify the autonomic scheduler of its new address. The new autonomic scheduler may notify all cloud agents so that they can update local application agents. The new autonomic scheduler may compare the submitted workflow stored in a local variable with the stages stored in the workflow management space to check for missing stages. If there are lost stages stored in the failed workflow manager, the new workflow manager may regenerate them in the space. The new autonomic scheduler may notify the workflow manager and cloud agents of its new address. The new cloud agent may notify the autonomic scheduler of its new address so as to change the contact point of the cloud.

Figure 11:
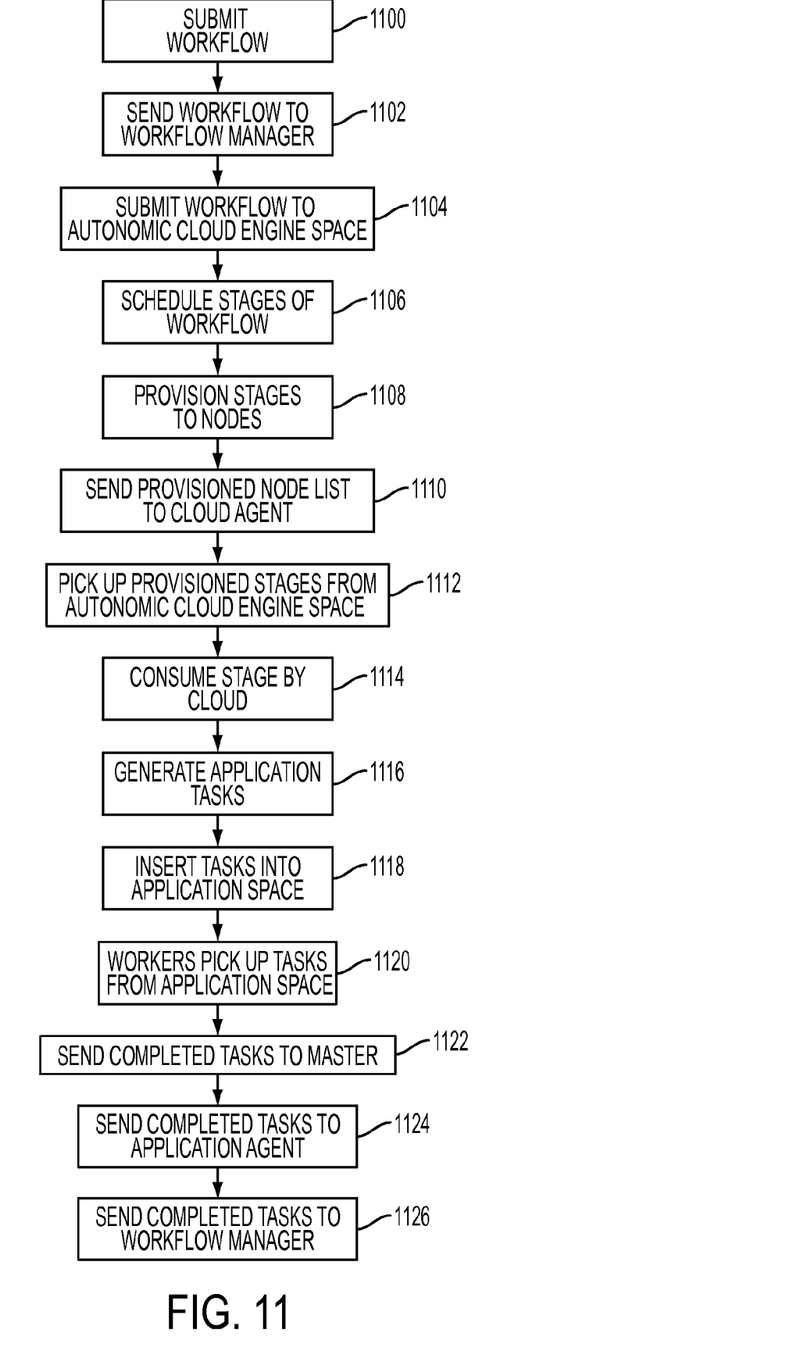
FIG. 11 illustrates an example method of processing a workflow by an autonomic workflow framework according to an embodiment.

FIG. 11 illustrates an example method of processing a workflow by an autonomic workflow framework according to an embodiment. As illustrated by FIG. 11, a workflow may be submitted 1100 to an autonomic workflow framework for processing. For example, as illustrated by FIG. 1, a workflow may be submitted to a web server of an autonomic workflow framework. The workflow may be sent 1102 to a workflow manager of an autonomic workflow framework, which may submit 1104 the workflow to an autonomic cloud engine space. An autonomic scheduler in communication with the workflow manager, may schedule 1106 one or more stages of the workflow based on information of a tag associated with the workflow. For example, an autonomic scheduler may schedule 1106 one or more stages of a workflow based on one or more user objectives associated with a workflow. In an embodiment, an autonomic scheduler may schedule 1106 one or more workflow stages based on resource status, changing workloads, and/or the like.

In an embodiment, the autonomic scheduler may provision 1108 one or more workflow stages to one or more nodes of a cloud in a federated cloud. The autonomic scheduler may send 1110 a provisioned node list to a cloud agent associated with the cloud. One or more application agents of the cloud may pick up 1112 the provisioned stages from the autonomic cloud engine space and the provisioned stages may be consumed 1114 by their associated clouds. In an embodiment, a cloud may include a master and one or more workers. The master may generate 1116 one or more applications tasks, and may insert 1118 them into an application space. Each worker may pick up 1120 a task from the application space whenever it becomes available and may consume it. The worker may send 1122 the completed task to the master. The master may gather the completed tasks and may send 1124 them to the responsible application agent. The application agent may send 1126 the collected results to the workflow manager.

Figure 12:
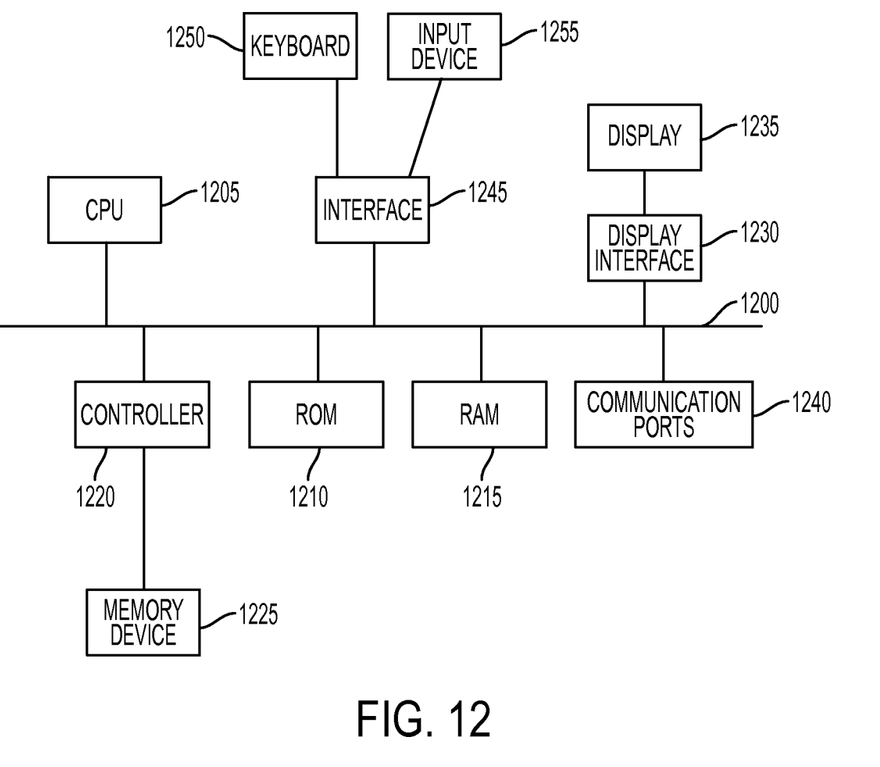
FIG. 12 illustrates a block diagram of hardware that may be used to contain or implement program instructions according to an embodiment.

FIG. 12 depicts a block diagram of hardware that may be used to contain or implement program instructions. A bus 1200 serves as the main information highway interconnecting the other illustrated components of the hardware. CPU 1205 is the central processing unit of the system, performing calculations and logic operations required to execute a program. CPU 1205, alone or in conjunction with one or more of the other elements disclosed in FIG. 12, is an example of a processing device, computing device or processor as such terms are used within this disclosure. Read only memory (ROM) 1210 and random access memory (RAM) 1215 constitute examples of memory devices.

A controller 1220 interfaces with one or more optional memory devices 1225 to the system bus 1200. These memory devices 1225 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 1210 and/or the RAM 1215. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 1230 may permit information from the bus 1200 to be displayed on the display 1235 in audio, visual, graphic or alphanumeric format. Communication with external devices, such as a printing device, may occur using various communication ports 1240. A communication port 1240 may be attached to a communications network, such as the Internet or an intranet.

The hardware may also include an interface 1245 which allows for receipt of data from input devices such as a keyboard 1250 or other input device 1255 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following embodiments.

What is claimed is:

1. An autonomic workflow framework comprising:
    a federated cloud comprising a plurality of clouds, wherein each cloud in the federated cloud comprises one or more nodes;
    a workflow manager configured to receive a workflow, wherein the workflow comprises a plurality of stages, wherein the workflow is associated with a user objective, wherein the user objective comprises one or more of the following:
    a budget constraint,
    a time constraint, and
    a privacy constraint: and
    an autonomic scheduler in communication with the workflow manager, wherein the autonomic scheduler is configured to provision one or more of the one or more nodes to process the stages to achieve the user objective.

2. The autonomic workflow framework of claim 1, wherein:
    the workflow manager is further configured to submit the stages to an autonomic cloud engine space; and
    each cloud comprises one or more application agents that are each configured to retrieve one or more of the stages from the autonomic cloud engine space.

3. The autonomic workflow framework of claim 2, wherein the application agents are each configured to process the stages according to a consumption policy.

4. The autonomic workflow framework of claim 3, wherein the application agents are each configured to process the stages using a master/worker paradigm.

5. The autonomic workflow framework of claim 2, wherein the application agents are each further configured to send one or more completed tasks for the stages to the workflow manager.

6. The autonomic workflow framework of claim 1, further comprising a resource manager in communication with the autonomic scheduler, wherein the resource manager is configured to:
    collect resource status information from the one or more nodes of the one or more clouds in the federated cloud; and
    provide at least a portion of the collected resource status information to the autonomic scheduler.

7. The autonomic workflow framework of claim 1, wherein the autonomic scheduler is further configured to monitor a resource status of the nodes, wherein the resource status comprises one or more of the following:
    CPU availability of a node;
    memory availability of a node; and
    network bandwidth of a node.

8. The autonomic workflow framework of claim 1, wherein the autonomic scheduler is further configured to manage one or more of the following:
    one or more clouds joining the federated cloud; and
    one or more clouds leaving the federated cloud.

9. The autonomic workflow framework of claim 1, wherein the autonomic scheduler is further configured to:
    monitor a progress of workflow processing; and
    adjust the provisioning in response to determining that processing will not achieve the user objective.

10. The autonomic workflow framework of claim 1, wherein the workflow manager is further configured to:
    determine whether one or more completed tasks associated with one or more stages are received within a time period; and
    in response to determining that that the one or more completed tasks associated with the one or more stages are not received within the time period, determining whether the user objective is violated.

11. The autonomic workflow framework of claim 1, wherein the plurality of clouds comprises at least one public cloud.

12. The autonomic workflow framework of claim 1, wherein the plurality of clouds comprises at least one private cloud.

13. An autonomic workflow framework comprising:
    a workflow manager configured to receive a workflow, wherein the workflow comprises a plurality of stages, wherein the workflow is associated with a user objective, wherein the user objective comprises one or more of the following:
    a budget constraint,
    a time constraint, and
    a privacy constraint;
    an autonomic scheduler in communication with the workflow manager, wherein the autonomic scheduler is configured to provision one or more of the nodes to process each stage in order to achieve the user objective;
    a resource manager in communication with the autonomic scheduler;
    a federated cloud comprising a plurality of clouds, wherein each cloud in the federated cloud comprises:
    one or more nodes,
    a cloud agent in communication with the resource manager, and
    one or more application agents; and
    an autonomic engine application space that is accessible by the autonomic scheduler, the workflow manager and each application agent.

14. The autonomic workflow framework of claim 13, wherein:
    each cloud agent is configured to send a join request to the autonomic scheduler, wherein the join request comprises a request for the cloud corresponding to the cloud agent to join the federated cloud and a list of addresses of its node; and the autonomic scheduler is further configured to register the cloud corresponding to the cloud agent that sends the join request into the federated cloud.

15. The autonomic workflow framework of claim 13, wherein the resource manager is configured to:

receive node availability information from at least one cloud agent, wherein the node availability information indicates whether one or more nodes of the cloud associated with the at least one cloud agent are available to process a stage; and send at least a portion of the node availability information to the autonomic scheduler.

16. The autonomic workflow framework of claim 13, wherein the autonomic scheduler is configured to send a list identifying the provisioned nodes of at least one of the clouds to the cloud agent of the at least one cloud; the cloud agent of the at least one cloud is configured to use the list to manage processing by the provisioned nodes of the at least one cloud; and the cloud agent is configured to manage processing of one or more stages by the provisioned nodes.

17. The autonomic workflow framework of claim 13, wherein the plurality of clouds comprises at least one public cloud.

18. The autonomic workflow framework of claim 13, wherein the plurality of clouds comprises at least one private cloud.

* * * * *